United States Patent

Montacie

[15] 3,644,000
[45] Feb. 22, 1972

[54] TOOL HAVING A SWEEPING MOVEMENT FOR CONTINUOUS BORING OR CUTTING MACHINE

[72] Inventor: Marcel Montacie, Paris, France
[73] Assignee: Union Industrielle Blanzy-Ouest, Paris, France
[22] Filed: Feb. 17, 1970
[21] Appl. No.: 11,992

[30] Foreign Application Priority Data

Feb. 17, 1969 France..................................6903893

[52] U.S. Cl..............................299/86, 175/106, 175/173, 299/80
[51] Int. Cl.....................................................E21c 27/24
[58] Field of Search ..................299/61, 80, 85, 86; 175/173, 175/202, 286, 106

[56] References Cited

UNITED STATES PATENTS 1,323,905  12/1919  Otto....................................175/286 X
2,750,176  6/1956  Cartlidge.................................299/80

Primary Examiner—Ernest R. Purser
Attorney—Sughrue, Rothwell, Mion, Zinn & Macpeak

[57] ABSTRACT

A tool for a rotating head of a continuous boring or cutting machine wherein the tools are mounted in pairs and are symmetrically arranged in relation to the axis of the rotating head and are caused to oscillate automatically in a radial direction by a rack and pinion drive mechanism operated by a double-action hydraulic jack means powered by an automatically controlled electrically driven hydraulic pump, wherein the movement of each pair of tools is synchronized and operate in opposite directions to each other to thereby provide dynamic and static balancing of the rotating head to perform a continuous boring or cutting operation.

5 Claims, 3 Drawing Figures

PATENTED FEB 22 1972 3,644,000

INVENTOR.
MARCEL MONTACIE
BY
Sughrue, Rothwell, Mion, Zinn & Macpeak
ATTORNEYS 3,644,000

TOOL HAVING A SWEEPING MOVEMENT FOR CONTINUOUS BORING OR CUTTING MACHINE

BACKGROUND OF THE INVENTION

Field of the Invention

The present invention relates to a tool for a continuous boring or cutting machine. The tool is mounted on a toolholder which carries out a sweeping movement in relation to a rotating head on which it is mounted.

It is possible to reduce the number of tools placed on the rotating head such that each of them sweeps over a larger zone of the cutting front than is the case when the tools do not have a relative movement in relation to the rotating had. For this reason, the total thrust being exerted on the rotating head is reduced and is proportional to the number of tools carried by the head. The individual thrust exerted on each tool is, however, maintained.

The object of the present invention is to obtain a more efficient use of such tools by providing a symmetrical mounting of the tools in pairs. Such a symmetrical mounting results in a statistically balanced head and further, by synchronizing the then asymmetrical movement at opposite speeds of the two toolholders of a single pair, the head can be maintained in dynamic equilibrium. The foregoing arrangement also makes it possible to rotate the head at higher speeds. This new arrangement in addition makes it possible to either, with the same, have a more powerful machine for a given weight when using the same number of tools and thus the same total thrust, or to reduce the number of tools, i.e., the pairs of tools, and thus reduce the total thrust to thereby provide a machine of equal power but of lighter weight.

The present invention has for its object to provide a tool for a rotating head of a continuous boring or cutting machine, mounted on a toolholder fixed to an arm having a sweeping movement such as that disclosed in the parent patent, the sweeping movement being in the plane passing through the axis of the rotating head. The tool is further characterized in that each of the tools so mounted is associated with another identical tool and toolholder so as to form a pair which is symmetrically mounted on the rotating head and balanced relative to the axis of the rotating head. The balance of the rotating head is maintained in its movement by the synchronization of the sweeping movement of the tools and by hydromechanical means disposed along the aforementioned axis.

In order to be able to better understand the objects and advantages of the present invention, one nonlimiting example of the invention is described in association with the accompanying drawing.

DESCRIPTION OF THE INVENTION

Figure 1:
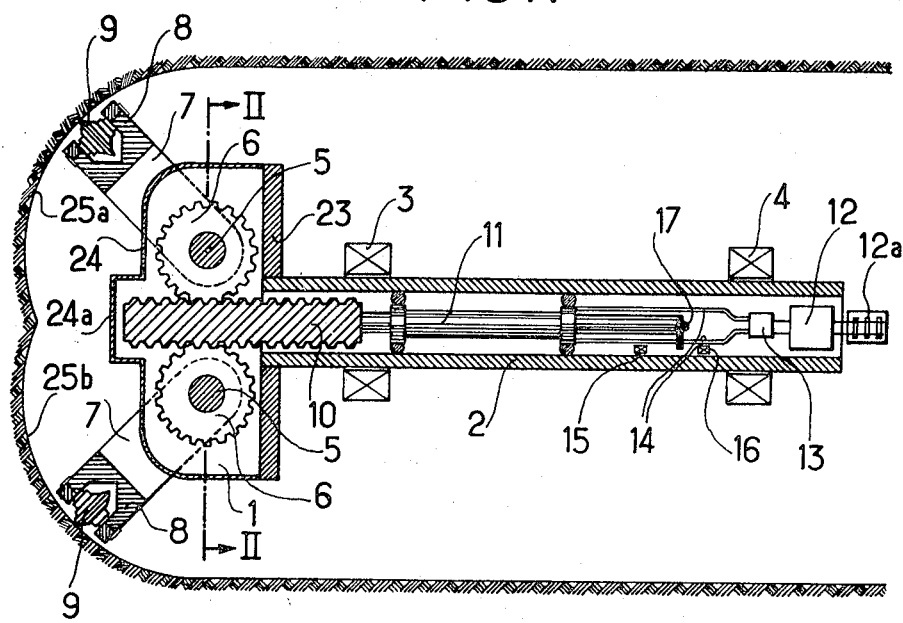
FIG. 1 represents a section of the machine of the present invention having a single pair of symmetrical tools.

In FIG. 1, the rotating head 1 is mounted at the end of a hollow shaft 2, which shaft is supported by two roller bearings 3 and 4. These bearings are fixed on the frame of the boring machine.

The head 1 consists essentially of a sheet metal disc 23 and two cheeks 21 and 22, also of sheet metal, welded to the disc 23.

Figure 2:
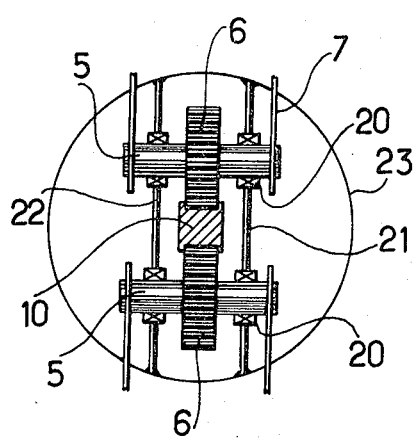
FIG. 2 represents a section taken along the lines II—II of the machine in FIG. 1 and, with the cover removed, shows the mechanism ensuring the sweeping movement of the tools.

A cover 24, comprising a projecting cylindrical front portion 24a, aids in sealing the driving means of the wheel-type cutters 9. The cutters 9 turn freely in the bearings of their toolholders 8 which are mounted on the arms 7 formed of plates fixed to the hubs 5. The hubs 5 turn in bearings 20 which are mounted in the cheeks 21 and 22 shown in FIG. 2.

These two hubs 5 are parallel and are disposed at an equal distance from the axis of the machine. Each hub 5 carries on its central portion a pinion 6 which meshes with a rack 10, which opposite faces have teeth cut for this purpose.

The rack 10 slides in the central portion of the head and also inside the shaft 2. By the reciprocatory movement of the rack 10, a rotational movement is imparted to the hubs 5 in opposite directions by means of the pinions 6, ensuring the sweeping movement by the tools 9 over the cutting front. The longitudinal section of the cutting front is formed by two arcs of circle 25a and 25b, respectively, centered on the axes of the hubs 5.

The reciprocating movement of the rack 10 is assured by a double-action twin-rod hydraulic jack 11 fixed inside the shaft 2. The oil necessary for operating this jack 11 is supplied by a motor pump assembly, wherein the electric motor 12 drives the gear pump 13, which is connected by two pipes 14 to the jack 11. The motor 12 is supplied with electrical energy by means of a rotating collector 12a. The reversal of the movement of the jack 11 is controlled by reversing the direction of rotation of the motor 12, this being assured electrically by the two limit contacts 15 and 16, operated by a stud 17 mounted on the rear end of the piston 11.

In FIG. 1, the space contained between the cheeks 21 and 22 and containing the driving mechanism of the toolholders is kept free from the dust and debris resulting from the operation of the machine by means of the sealing joints disposed on the hubs 5 around the bearings 20, and by association with the cover (FIG. 1) welded to the cheeks.

Figure 3:
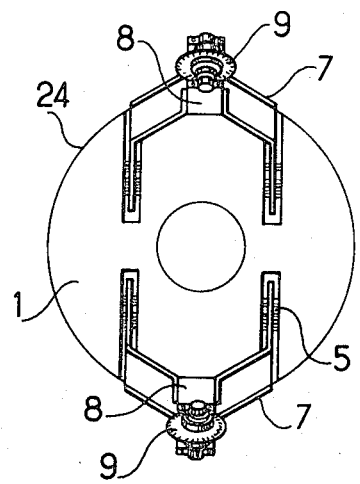
FIG. 3 shows the rotating head as viewed from the front of the machine shown in FIG. 1.

In FIG. 3, the rotating head 1 is seen from the front as it appears during the boring operation. The tools 9 attack the cutting front symmetrically in relation to the axis of the head 1; while the head 1 is statistically balanced, it is also dynamically balanced by the action of the synchronous drive of the tools at equal and opposite speeds.

It is pointed out that the invention is not limited to the particular embodiment which has just been described, but comprises all the modifications which correspond to the general definition which has already been given.

Thus, several pairs of tools can be mounted on a single rotating head wherein the tools of one pair function in synchronism with the tools of another pair. It is then sufficient to shift the phase of the movements of the various pairs relative to one another so that the passages of the tools of one pair in the vicinity of one another are staggered relative to those of the other pair, thus preventing the other pair from interfering with one another in the vicinity of the rotating head.

Finally, in order to avoid any difficulty with regard to working of the tools toward the center of the tunnel which is being cut, that is to say, along the axis of the rotating head, it is also possible to offset the tool relative to the toolholder and also the toolholder relative to the arm supporting it.

What is claimed is:

1. In a tool for a rotating head of a continuous boring or cutting machine which is mounted on a toolholder fixed to an arm having a sweeping movement in a plane passing through the axis of said rotating head, the improvement comprising: each of said tools being mounted in association with another identical tool and toolholder so as to form a pair of tools symmetrically mounted on said rotating head and balanced relative to the axis of said head, said balancing being maintained by both synchronization of the sweeping movement of said tools in directions opposite to one another and by hydromechanical means disposed along said axis, said hydromechanical means comprising a rack having teeth cut on two opposite faces thereof, two pinions connected to said tools and being mounted for rotational movement on said rotating head, said two pinions being drivingly associated with said rack, a double-acting hydraulic jack means operatively connected with said rack for reciprocating said rack longitudinally for moving said tools in said sweeping movement in a reciprocatory motion, said double-acting jack being operatively connected with a source of hydraulic fluid pressure, said source of hydraulic fluid pressure being automatically reversible in response to signal means indicating limits of the longitudinal motion of said double-acting hydraulic jack for reversing the direction of movement of said jack.

2. In a tool for a rotating head according to claim 1, wherein said rotating head comprises only one pair of symmetrically mounted tools.

3. In a tool for a rotating head according to claim 1 wherein said sweeping arms are secured to shafts which are mounted in bearings attached to cheeks secured to said head, and a sheet metal cover welded to said cheeks for protecting the mechanism during said sweeping movement.

4. In a tool for a rotating head according to claim 1, the improvement further comprising, each of said tools being mounted on said toolholder about an axis perpendicular to the longitudinal axis of said arm.

5. The improvement as recited in claim 1, wherein said hydraulic pressure source is comprised of a hydraulic pump operatively connected with said double-acting hydraulic jack, and a reversible electric motor drivingly connected to said hydraulic pump, the direction of rotation of said electric motor being controlled automatically in response to said limit sensing means for reversing the movement of said hydraulically operated double-acting jack to automatically reciprocate said rack during rotation of said rotating head.

* * * * *